United States Patent [19]
Brown et al.

[11] Patent Number: 6,054,536
[45] Date of Patent: Apr. 25, 2000

[54] EPOXY RESIN COMPOSITIONS

[75] Inventors: Peter Thomas Brown, Nr Newmarket, United Kingdom; Wolfgang Schneider, Kaiseraugst, Switzerland; Richard John Fieldsend, Balsham, United Kingdom

[73] Assignee: Ciba Specialty Chemicals Corp., Tarrytown, N.Y.

[21] Appl. No.: 09/124,139

[22] Filed: Jul. 29, 1998

[51] Int. Cl.$^7$ ........................................................ C08F 8/14

[52] U.S. Cl. ........................ 525/107; 525/327.3; 525/454; 525/528

[58] Field of Search ................. 525/107, 327.3, 525/454, 528

[56] References Cited

U.S. PATENT DOCUMENTS

| | | | |
|---|---|---|---|
| 4,096,104 | 6/1978 | McGinniss | 260/29.6 |
| 4,358,477 | 11/1982 | Noomen et al. | 427/54.1 |
| 5,198,524 | 3/1993 | Bush et al. | 528/87 |

FOREIGN PATENT DOCUMENTS 0476388  3/1992  European Pat. Off. .

OTHER PUBLICATIONS

Derwent Abstract 90–071337/199010.
Derwent Abstract 88–058900/198809.
Derwent Abstract 92–080947 for EP 0476388.

*Primary Examiner*—Robert Dawson
*Assistant Examiner*—D. Aylward
*Attorney, Agent, or Firm*—David R. Crichton; Michele A. Kovaleski

[57] ABSTRACT

The present invention provides a coating composition comprising one or more curable resins which contain, among the resins, free acrylic moieties and free or reacted epoxy moieties, and a ketone blocked polyamine type curing agent, the ingredients being chosen to provide in the coating after curing, more than 50% by weight of cured epoxy groups and less than 50% by weight of cured acrylic groups.

7 Claims, No Drawings

EPOXY RESIN COMPOSITIONS

The present invention relates to curable epoxy resin compositions suitable for use as coatings and adhesives.

Epoxy coating compositions usually contain solid or semi-solid epoxy resins in an organic solvent. When the solvent has evaporated, a solid or near solid residue forms a film even before significant reaction with the hardener takes place.

There is an increasing need to reduce the amount of organic solvents used in such coatings and produce what is referred to a low Volatile Organic Content (V.O.C).

The amount of V.O.C. is desirably reduced to 20% of the total or less. To achieve viscosities low enough for application by a spray gun it is necessary to use liquid epoxy resins instead of the solid or semi-solid type. This means that a rapid reaction is needed in order to render the liquid resins solid shortly after the solvent has evaporated.

We have now found that this can be achieved by incorporating into the composition an acrylic resin and a certain type of latent curing agent for both the acrylic and epoxy resins.

Accordingly the present invention provides a coating composition comprising one or more curable resins which contain, among the resins, free acrylic moieties and free or reacted epoxy moieties, and a ketone blocked polyamine type curing agent, the ingredients being chosen to provide in the coating after curing, more than 50% by weight of cured epoxy groups and less than 50% by weight of cured acrylic groups.

Ketone blocked polyamines (sometimes called ketimines) are produced by condensing amines with ketones to produce alkylnitrilo (1-alkyl) alkylidyne compounds.

For example, 2 moles of ketone reacted with diethylenetriamine.

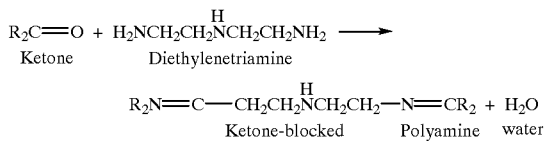

yield a compound in which both primary amines are blocked. In this case, as there is still a reactive hydrogen present, reaction of the imine with 1 mole of phenyl glycidyl ether eliminates the active hydrogen on the secondary amine:

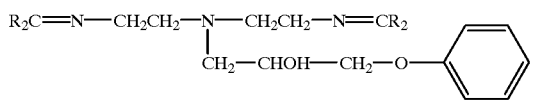

Such a compound, when incorporated into the composition has low reactivity. However, because of hydrolytic instability of the double bond in these compounds, hydrolysis occurs with moisture from the air once the composition is applied, and the regenerated primary amines provide cure. The ketone which is regenerated diffuses to the surface and evaporates.

The regenerated amine reacts very rapidly with the acrylic resin, even at ambient temperatures. This causes rapid solidification of the film, thereby holding the film in position while the epoxy resin is cured by the amine.

The curing agent may be derived from a polyamine having from 2 to 6 amino groups, preferably from 3 to 5 amino groups. The ketone blocking group may be derived from a ketone of the formula $R_1R_2C=O$ where $R_1$ and $R_2$ are, independently, alkyl groups having from 1 to 15 carbon atoms, preferably from 1 to 4 carbon atoms.

Suitable epoxides include polyglycidyl esters, polyglycidyl ethers, and cycloaliphatic epoxides.

Epoxides which may be employed are preferably those containing, on average, more than one group of formula

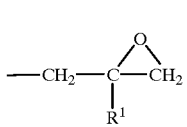

(I)

directly attached to an atom or atoms of oxygen or nitrogen, where $R^1$ denotes a hydrogen atom or a methyl group.

As examples of such epoxides may be mentioned polyglycidyl and poly(beta-methylglycidyl) esters obtainable by reaction of a compound containing two or more carboxylic acid groups per molecule with epichlorohydrin, glycerol dichlorohydrin, or beta-methylepichlorohydrin in the presence of an alkali. Such polyglycidyl esters may be derived from aliphatic polycarboxylic acids, e.g. oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(beta-methylglycidyl)ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly (oxypropylene)glycols, propane-1,3-diol, butane-1,4-diol, poly(oxytetramethylene)glycols, pentane-1,5diol, hexane-1,6-diol, hexane-2,4,6-triol, glycerol, 1,1,1-trimethylolpropane, pentaerythritol, sorbitol, and polyepichlorohydrins; from cycloaliphatic alcohols such as resorcitol, quinitol, bis(4-hydroxycylohexyl)methane, 2,2-bis(4-hydroxycyclohexyl)propane, and 1-1-bis(hydroxymethyl) cyclohex-3-ene; and from alcohols having aromatic nuclei, such as 2,4-(dihydroxymethyl)benzene. They may also be made from mononuclear phenols, such as resorcinol and hydroquinone, and from polynuclear phenols, such as bis (4hydroxyphenyl)methane, 4,4'-dihydroxydiphenyl, 1,1,2,2-tetrakis(4-hydroxyphenyl)ethane, 2,2-bis(4hydroxyphenyl)-propane, 2,2-bis(3,5dibromo-4-hydroxyphenyl)propane, and novolaks formed from aldehydes such as formaldehyde, acetaldehyde, chloral, and furfuraldehyde, vith phenols such as phenol itself, and phenol substituted in the ring by chlorine atoms or by alkyl groups each containing up to nine carbon atoms, such as 4chlorophenol, 2-methylphenol, and 4-tert-butylphenol.

Epoxides in which some or all of the epoxide groups are not terminal may also be employed, such as vinylcyclohexane dioxide, limonene dioxide, dicyclopentadiene dioxide, 4-oxatetracyclo $[6,2.1.0^{2,7}.0^{3,5}]$ undec-9-yl glycidyl ether, the bis(4-oxatetracyclo$[6.2.1.0^{2,7}.0^{3,5}]$ undec-9-yl ether or ethylene glycol, 3-4-epoxycylohexylmethyl 3', 4'-epoxycyclohexane carboxylate and its 6,6$^1$ dimethyl derivative, the bis(3,4-epoxycyclohexane-carboxylate) of ethylene glycol, 3-(3,4-epoxycyclohexyl)-8.9-epoxy-2,4-dioxaspire[5,5]undecane, and epoxidised butadienes or copolymers of butadiene with ethylentic compounds such as styrene and vinyl acetate.

Epoxide resin having the 1,2-epoxide groups attached to different kinds of hetero atoms may be employed, e.g. the glycidyl ether-glycidyl ester of salicyclic acid. If desired, a mixture of epoxide resins may be used.

Preferred epoxides are polyglycidyl esters, polyglycidyl ethers of 2,2-bis(4-hydroxyphenyl)propane, of bis(4-hydroxyphenol)-methane or of a novolak formed from formaldehyde and phenol, or phenol substituted in the ring by one chlorine atom or by one alkyl hydrocarbon group containing from one to nine carbon atoms, and having a 1,2-epoxide content of at least 0.5 equivalent per kilogram, and 3,4-epoxycyclohexylmethyl 3', 4'-epoxycyclohexane carboxylate.

Suitable acrylic resins include compounds in containing at least two groups of formula

where $R^3$ represents a hydrogen or chlorine atom, or a methyl or ethyl group.

Sutable est having at least two groups of formula (II) include esters, especially acryfates and methacylates, of aliphaic, cycoaeliphatic, alicyclyaliphatic, araliphatic or heterocyclyialiphatic polyhydric alcohols, especially diols and briols; polyhydroxy-, particularly dihydroxy-, carboxyfic acid; polyhydroxy-, particularly dihydroxy-, alkylamines; and polyhydroxy-, particularly dihydroxy-, alkylnitriles. Acrylic ester-urethanes and -ureides may also be used. Such esters are, in general, commercially available, and any that are not may be prepared by known methods.

Suitable acrylic esters include those of formula

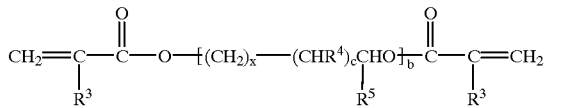

where $R^3$ is as hereinbefore defined,
$R^5$ denotes H, —CH$_3$, —C$_2$H$_5$, —CH$_2$OH, or

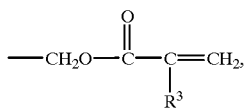

$R^4$ denotes H, OH, or

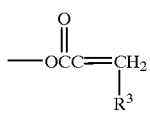

x is an integer of from 1 to 8,
b is an integer of from 1 to 20, and
c is zero or 1.

Among compounds of formula (III), those where x is from 1 to 4, b is from 1 to 5 and $R^3$ denote a hydrogen atom or a methyl group are preferred. Specific examples of such compound are the diacylates and dimethac a of ethylene glycol, propylene glycol, butane-1,4-diol, diethylene glycol, dipropylene glycol, triethylene glycol, bipropylene glycol, tetraethylene glycol and tetrapropylene glycol.

Other suitable acrylic esters are of formula:

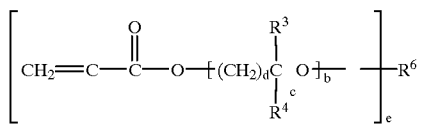

where
b, c, $R^3$ and $R^4$ have the meanings assigned above, d is zero or a positive integer, provided that c and d are not both zero,
e is 2, 3, or 4, and
$R^6$ denotes an organic radical of valency e linked through a carbon atoms or carbon atoms thereof to the indicated b oxygen atoms.

Preferred among compounds of formula (IV) are those where b, c and d are each 1, $R^3$ is a hydrogen atom or methyl group and $R^6$ is a hydrocarbon residue of an aliphatic polyhydric alcohol having from 2 to 6 carbon atoms, such as a pentaerythrityl group. A specific example of such compounds is pentaerythrityl tetrakis (dimethylene glycol acrylate).

Still other suitable esters are urethane acrylates and ureide acrylates of formula:

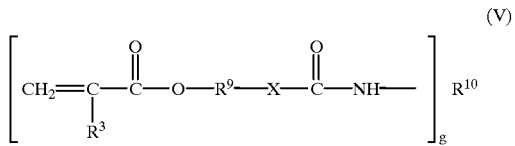

where
$R^3$ has the meaning assigned above,
$R^9$ denotes a divalent aliphatic, cycloaliphabc, aromatic, or araliphatic group, bound through
a carbon atom or carbon atoms thereof of the indicate —O— atom and —X— atom or group,
X denotes —O—, —NH—, or —N(alkyl)—, in which the alkyl radical has from 1 to 8 carbon atoms,
g is an integer of at least 2 and at most 6, and
$R^{10}$ denotes a g-valent cycloaliphatic, aromatic, or araliphatic group bound through a carbon atoms or carbon atoms thereof to the indicate NH groups.

Preferably $R^9$ denotes a divalent aliphatic group of 2 to 6 carbon atoms and $R^{10}$ denotes one of the following:
a divalent aliphatic group of 2 to 10 carbon atoms, such as a group of formula
—(CH$_2$)$_6$—, CH$_2$C(CH$_3$)$_2$CH$_2$CH(CH$_3$)(CH$_2$)—, or —CH$_2$CH(CH$_3$)CH$_2$C(CH$_3$)$_2$CH$_2$)$_2$—; or
a phenylene group, optionally substituted by a methyl group or a chlorine atom; a naphthylene group; a group of formula
—C$_6$H$_4$C$_6$H$_4$—, C$_6$H$_4$CH$_2$C$_6$H$_4$—, or —C$_6$H$_4$C(CH$_3$)$_2$C$_6$H$_4$—;
or a mononuclear alkylcycloalkylene or alkylcycloalkylalkylene group of from 6 to 10 carbon atoms, such as a methylcyclohex-2, 4-ylene, methylcyclohex-2,6-ylene, or 1,3,3-trimethylcyclohex-5-ylenemethyl group.

Specific examples of compounds of formula (V) are 2,4- and 2,6-(bis(2-acryloyloxyethoxycarbonamido)toluene and the corresponding methacryloyloxy compounds.

Further suitable acrylic esters are those of formula

(VI)

where

R$^3$ has the meaning assigned above,

R$^{11}$ denotes CH$_3$—, C$_2$H$_5$—, —CH$_2$OH or CH$_2$=C(R$^3$) COOCH$_2$—, and R$^{12}$ denotes —CH$_2$OH or —CH$_2$OOC—C(R$_3$)=CH$_2$, especially 1,1,1-trimethylolpropane triacrylate, pentaerythritol tetra-acrylate and the corresponding methacrylates.

Still further suitable acrylic esters are those of formula

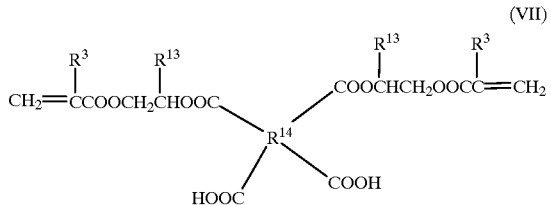
(VII)

where

R$^3$ has the meaning assigned above,

R$^{13}$ denotes —H, —CH$_3$ or —CH$_2$Cl, and

R$^{14}$ denotes a tetravalent residue, containing up to 20 carbon atoms and one or more carbocyclic rings, of a tetracarboxylic acid after removal of four carboxyl groups, each indicate pair of groups —COOCH(R$^{13}$) CH$_2$OOCC(R$^3$)=CH$_2$ and —COOH being directly linked to adjacent carbon atoms.

Preferably, R$^3$ and R$^{13}$ are —H or —CH$_3$ and R$^{14}$ is the residue of an aromatic tetracarboxylic acid having one or two benzene rings, especially pyromellitic acid or benzophenone-3, 3', 4,4'-tetracarboxylic acid.

Examples of compounds in which epoxy groups are at least partially reacted with acidic groups in an acrylic resin are those of the formula:

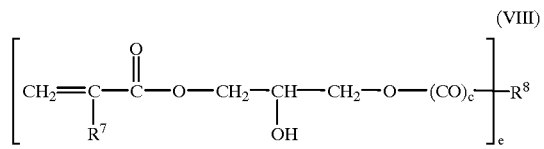
(VIII)

where c and e have the meanings previously assigned,

R$^7$ denotes —H or —CH$_3$, and

R$^8$ denotes an organic radical of valency e, linked through a carbon atom thereof other than the carbon atom of a carbonyl group.

More particularly, when c is zero, R$^8$ may denote the residue, containing from 1 to 60 carbon atoms, of an alcohol or phenol having e hydroxyl groups.

R$^8$ may thus represent an aromatic, araliphatic, alkaromatic, cycloaliphatic, heterocyclic, or heterocycloaliphatic group, such as an aromatic group containing only one benzene ring, optionally substituted by chloride, bromine or an alkyl group of from 1 to 9 carbon atoms, or an aromatic group comprising a chain of two to four benzene rings, optionally interrupted by ether oxygen atoms, aliphatic hydrocarbon groups of 1 to 4 carbon atoms, or sulphone groups, each benzene ring being optionally substituted by chloride, bromine or an alkyl group of from 1 to 9 carbon atoms, or a saturated or unsaturated, straight or branched-chain aliphatic group, which may contain ether oxygen linkages and which may be substituted by hydroxyl groups, especially a saturated or monoethylenically unsaturated straight chain aliphatic hydrocarbon group of from 1 to 8 carbon atoms.

Specific examples of such groups are the aromatic groups of the formulae —C$_6$H$_4$C(CH$_3$)$_2$C$_6$H$_4$—, in which case e is 2, and —C$_6$H$_4$(CH$_2$C$_6$H$_3$—)$_f$—CH$_2$C$_6$H$_4$—where f is 1 or 2, in which case e is 3 or 4, and the aliphatic groups of formula —CH$_2$CHCH$_2$— or CH$_2$CH(CH$_2$)$_3$CH$_2$—, in which case e is 3, or of formula —(CH$_2$)$_4$—, —CH$_2$CH=CHCH$_2$—, CH$_2$CH$_2$OCH$_2$CH$_2$—, or —(CH$_2$CH$_2$O)$_2$CH$_2$CH$_2$—, in which case e is 2.

When c is 1, R$^8$ may represent the r esidue, containing from 1 to 60 carbon atoms, of an acid having e carboxyl groups, preferably a saturated or ethylenically unsaturated, straight chain or branched aliphatic hydrocarbon group of from 1 to 20 carbon atoms, which may be substituted by chlorine atoms and which may be interrupted by ether oxygen atoms and/or by carbonyloxy (—COO—) groups, or a saturated or ethylenically unsaturated cycloaliphatic or aliphatic-cydoaliphatic hydrocarbon group of at least 4 carbon atoms, which may be substituted by chlorine a toms, or an aromatic hydrocarbon group of from 6 to 12 carbon atoms which may be substituted by chlorine or bromine atoms.

Further preferred compounds where c is 1 are those in which R$^8$ represents a saturated or ethylenically unsaturated straight chain or branched aliphatic hydrocarbon group of from 1 to 8 carbon atoms, optionally substituted by a hydroxyl group, or a saturated or ethylenically unsaturated straight chain or branched aliphatic hydrocarbon group of from 4 to 50 carbon atoms and interrupted in the chain by carbonyloxy groups, or a saturated or ethylenically unsaturated monocyclic or bicyclic cycloaliphatic hydrocarbon group of 6 to 8 carbon atoms, or an ethylenically unsaturated cycloaliphatic-aliphatic hydrocarbon group of from 10 to 51 carbon atoms, or a mononuclear aromatic hydrocarbon group of from 6 to 8 carbon atoms. Specific examples of these residues of carboxylic acid are those of formula —CH$_2$CH$_2$—, CH=CH—, and —C$_6$H$_4$—where e is 2.

R$_8$ may also contain one or more epoxy groups of the formula (I) above.

Specific examples of suitable compounds of formula (VIII) are epoxy acrylates such as 1,4bis(2-hydroxy-3 (acryloyloxy)propoxy)butane, poly(2-hydroxy-3-(acryloyloxy)propyl)ethers of bis(4-hydroxyphenyl) methane (bisphenol F), 2,2-bis(4-hydroxyphenyl)propane (bisphenol A) and phenol-formaldehyde novolaks, bis(2-hydroxy-3-acryloyloxypropyl) adipate and the methacryloyloxy analogues of these compounds.

The compounds of formula (VIII) may be prepared, for example, by reacting an acrylic or methacrylic acid with the appropriate amount of epoxy resin to give either a fully acrylated epoxy resin product or a dual functional material which contains both acrylic groups and epoxy groups.

When an epoxy acrylate or a dual functional material is used, it may replace all or part of the epoxy resin and/or acrylic resin.

Preferably the ingredients of the coating composition are chosen to provide, in the coating after curing, 51 to 95% by weight of cured epoxy groups, preferably 51 to 80% by weight. The remainder of the cured groups are from the acrylic groups.

It should be noted that some of the cured epoxy groups may come from the curing agent if one is used which has had any reactive hydrogen reacted with a glycidyl ether.

Thus the coating composition may contain an acrylic resin plus an epoxy resin; an acrylated epoxy resin with or without an epoxy resin; or a dual functional material with or without another epoxy resin.

Sufficient curing agent is used to react with both the acrylic moieties and any free epoxy moieties. Actual amounts needed vary according to the specific compounds used.

If the viscosity of the composition is too high to enable it to be sprayed, an organic solvent may be added. Suitable solvents include hydrocarbons, especially aromatic hydrocarbons such as xylene, and alcohols, for example butanol.

The invention is illustrated by the following Examples.

EXAMPLES 1 to 3

Formulations are made up using a liquid epoxy resin based on bisphenol A. Acrylic esters used are an epoxy acrylate sold under the Tradename UVU 100 by Croda or a urethane acrylate sold under the Tradename Ebercryl 220 by Radcure/UCB. A 4:1 mixture of xylene acid n-butanol is used as solvent. The curing agent is a ketone blocked polyamine sold under the Tradename Hardener LC 283 by Ciba-Geigy. The amounts used are shown in Table 1 in parts by weight.

TABLE 1

| Example | 1 | 2 | 3 |
|---|---|---|---|
| Epoxy resin | 100 | 100 | 100 |
| UVU 100 | 30 | — | — |
| Ebecryl 220 | — | 30 | 50 |
| LC 283 | 56.5 | 62.7 | 75.25 |
| Solvent | 21.1 | 22.2 | 26.7 |

Each formulation is sprayable and rapidly forms a solid film.

EXAMPLE 4

A formulation is made up of 80 parts by weight of an epoxy diacrylate formed from acrylic acid and the diglycidyl either of bisphenol A; 20 parts by weight of a 4:1 mixture of xylene and n-butanol; and 33 parts by weight of hardener LC 283.

The formulation is sprayable and gives a re-coat time of 3–4 hours at 20° C. and 3–5 hours at 5° C. The coating is rub resistant to methyl ethyl ketone after 16 hours.

What we claimed is:

1. A coating composition comprising one or more curable resins which contain, among the resins, free acrylic moieties and free or reacted epoxy moieties, in which resins at least some of the acsylic moieties are present in a fully acrylated epoxy resin or in a dual functional material which contains both aciylic groups and epoxy groups, and a ketone blocked polyamine type curing agent derived from an amine having from 2 to 6 amino groups and a ketone of the formula $R_1R_2C=O$ where $R_1$ and $R_2$ are, independently, alkyl groups having from 1 to 15 carbon atoms, the ingredients being chosen to provide in the coating after curing, more than 50% by weight of cured epoxy groups and less than 50% by weight of cured acrylic groups.

2. A composition as claimed in claim 1 in which any active hydrogen atoms remaining in the curing agent are reacted with a glycidyl ether.

3. A composition as claimed in claim 1 in which the epoxy moieties are present in an epoxy resin which is a polyglycidyl ester, a polyglycidyl ether or a cycloaliphatic epoxide.

4. A composition as claimed in claim 1 in which the epoxy resin is a polyglycidyl ether or bisphenol A or bisphenol F.

5. A composition claim 1 in which the acrylic moieties are present in an acrylic resin which is a compound containing at least two groups of formula

6. A composition as claimed in claim 1 in which the acrylic resin is a urethane acrylate.

7. A composition according to claim 1 in which at least some of the epoxy moieties are pre-reacted and form part of the acrylic resin as a fully acrylated epoxy resin as a fully acrylated epoxy resin or as a dual functional material which contains both acrylic groups and epoxy groups.

* * * * *

UNITED STATES PATENT AND TRADEMARK OFFICE
CERTIFICATE OF CORRECTION

PATENT NO. : 6,054,536
DATED : APRIL 25, 2000
INVENTOR(S) : JEAN-MARIE ADAM ET AL.

It is certified that error appears in the above-identified patent and that said Letters Patent is hereby corrected as shown below:

On the title page, Section [30] should read:

-- [30]   Foreign Application Priority Data

Sept. 2, 1997 [GB]   United Kingdom   9718469.1 --.

Signed and Sealed this

Sixth Day of March, 2001

Attest:

NICHOLAS P. GODICI

*Attesting Officer*   *Acting Director of the United States Patent and Trademark Office*